US012085261B2

(12) United States Patent
Gao

(10) Patent No.: US 12,085,261 B2
(45) Date of Patent: Sep. 10, 2024

(54) LUMINAIRE

(71) Applicant: ACEVEL (GD) CO., LTD., Guangdong (CN)

(72) Inventor: Meiqin Gao, Guangzhou (CN)

(73) Assignee: ACEVEL (GD) CO., LTD., Guangzhou (CN)

(*) Notice: Subject to any disclaimer, the term of this patent is extended or adjusted under 35 U.S.C. 154(b) by 186 days.

(21) Appl. No.: 17/789,710

(22) PCT Filed: Jul. 13, 2020

(86) PCT No.: PCT/CN2020/101739
§ 371 (c)(1),
(2) Date: Jun. 28, 2022

(87) PCT Pub. No.: WO2021/227237
PCT Pub. Date: Nov. 18, 2021

(65) Prior Publication Data

US 2023/0060126 A1 Mar. 2, 2023

(30) Foreign Application Priority Data

May 15, 2020 (CN) ......................... 202020823135.9

(51) Int. Cl.
*F21V 14/06* (2006.01)
*F21V 17/12* (2006.01)
*F21V 19/02* (2006.01)

(52) U.S. Cl.
CPC .............. *F21V 14/06* (2013.01); *F21V 17/12* (2013.01); *F21V 19/02* (2013.01)

(58) Field of Classification Search
CPC ........... F21V 14/06; F21V 17/12; F21V 19/02
See application file for complete search history.

(56) References Cited

U.S. PATENT DOCUMENTS 4,187,534 A * 2/1980 Tichenor ................. F21V 17/02 362/268
4,316,237 A 2/1982 Yamada et al.
(Continued)

FOREIGN PATENT DOCUMENTS

CN 202109214 U 1/2012
CN 202629607 U 12/2012
(Continued)

OTHER PUBLICATIONS

PCT International Search Report and PCT Written Opinion of the International Searching Authority; Application No. PCT/CN2020/101739; Jan. 27, 2021; 11 pages.
(Continued)

*Primary Examiner* — Abdulmajeed Aziz
*Assistant Examiner* — Jessica M Apenteng
(74) *Attorney, Agent, or Firm* — Conley Rose, P.C.; Brooks W Taylor

(57) ABSTRACT

A luminaire includes a lamp barrel having a light source detachably connected with a lens assembly. The lens assembly includes a lens barrel detachably connected with the lamp barrel and a focusing member on the lens barrel. An adjusting assembly includes a rotatable focusing ring, a lens fixing ring and a lens. The focusing ring includes a spiral groove on an inner surface. The lens fixing ring includes a projected rail on an outer surface. The lens barrel includes a bar shaped through hole extending along an axial direction. The projected rail passes through the bar shaped through hole and is mated with the spiral groove by clearance fit. Rotation of the focusing ring acts on the projected rail through the spiral groove and drives the lens fixing ring and the lens forward and backward in the lens barrel to adjust a distance between the lens and the light source.

19 Claims, 11 Drawing Sheets

(56) References Cited

U.S. PATENT DOCUMENTS

| | | | | |
|---|---|---|---|---|
| 8,641,225 | B2 * | 2/2014 | Yeh | F21V 14/065 362/202 |
| 9,395,066 | B2 * | 7/2016 | Nemeyer | F21V 14/065 |
| 11,035,553 | B1 * | 6/2021 | Hsu | F21V 21/30 |
| 2005/0254233 | A1 * | 11/2005 | Alessio | F21V 14/065 362/169 |
| 2005/0286250 | A1 * | 12/2005 | Tanaka | G02B 7/10 362/319 |
| 2014/0333907 | A1 * | 11/2014 | Takehana | G02B 27/141 353/101 |
| 2015/0252983 | A1 * | 9/2015 | Lee | F21V 14/065 362/109 |
| 2019/0235204 | A1 * | 8/2019 | Ito | G02B 13/02 |
| 2020/0063951 | A1 | 2/2020 | Yu et al. | |
| 2022/0146080 | A1 * | 5/2022 | Gu | F21V 14/06 |

FOREIGN PATENT DOCUMENTS

| | | | |
|---|---|---|---|
| CN | 104006355 | A * | 8/2014 |
| CN | 206093625 | U | 4/2017 |
| CN | 207925095 | U | 9/2018 |
| CN | 209540656 | U | 10/2019 |
| CN | 209688609 | U | 11/2019 |
| CN | 110985914 | A | 4/2020 |
| JP | 2000149620 | A | 5/2000 |
| KR | 20100124063 | A | 11/2010 |

OTHER PUBLICATIONS

European Extended Search Report; Application No. 20935706.0; Nov. 23, 2023; 8 pages.

* cited by examiner

LUMINAIRE

CROSS-REFERENCE TO RELATED APPLICATIONS

This is a U.S. National Stage of International Patent Application No. PCT/CN2020/101739 filed on Jul. 13, 2020, which claims priority to Chinese Patent Application No. 202020823135.9 filed on May 15, 2020. Both of the aforementioned applications are hereby incorporated by reference in their entireties.

TECHNICAL FIELD

The present disclosure relates to a technical field of illumination, and in particular, to a luminaire.

BACKGROUND OF THE INVENTION

Luminaires are common equipment in the field of illumination. In the prior art, there are downlights, guide lights, spotlights and so on to enrich the decorative effect.

In the prior art, a distance between a lens and a light source in some luminaires is basically fixed and cannot be adjusted.

In the prior art, in order to overcome the above defect, some luminaires adopt a way of pushing to push the lens to move linearly in a lamp barrel, so as to adjust the distance between the light source and the lens. Specifically, a bar shaped through hole is provided on the lamp barrel, a handle is provided on a lens mounting ring, and the handle is located in an opening and extends out of the lamp barrel. When it is needed to push the lens to move, the handle can be held directly to drive the lens mounting ring to move linearly within the lamp barrel for distance adjustment.

However, by the linearly pushing way mentioned above, the moving distance of the lens mounting ring is difficult to precisely control when the lens mounting ring is pushed and pulled. The moving distance of the lens mounting ring is completely controlled by the force of the operator's hand, which makes it difficult to control the focusing and leads to inaccurate adjustment of the focusing length.

In view of above, it is necessary to provide a luminaire that can facilitate focusing in a more precise way.

SUMMARY OF THE INVENTION

The technical solution of the disclosure provides a luminaire, which comprises a lamp barrel having a light source and a lens assembly detachably connected with the lamp barrel. The lens assembly comprises a lens barrel detachably connected with the lamp barrel and a focusing member assembled on the lens barrel. A focusing member comprises a focusing ring sheathed on the lens barrel and rotatable on the lens barrel, a lens fixing ring installed in the lens barrel and movable forward and backward, and a lens installed in the lens fixing ring. A spiral groove is provided on an inner surface of the focusing ring, and a projected rail is provided on an outer surface of the lens fixing ring. A bar shaped through hole extending along an axial direction of the lens barrel is provided on the lens barrel, and the projected rail passes through the bar shaped through hole and is mated with the spiral groove by clearance fit.

Further, two focusing members arranged one behind the other are assembled on the lens barrel. Accordingly, two bar shaped through holes are provided on the lens barrel, and the two bar shaped through holes are arranged one behind the other on the lens barrel. The projected rail of one of the focusing members passes through one bar shaped through hole, and the projected rail of the other focusing member passes through the other bar shaped through hole.

Further, an opening of one of the bar shaped through holes is located at a front end of the lens barrel, and an opening of the other bar shaped through hole is located at a rear end of the lens barrel. The two bar shaped through holes are arranged on opposite sides of the lens barrel.

Further, a guide groove extending along the axial direction is provided on an outer ring surface of the lens fixing ring, and a guide projected rib extending along the axial direction is provided on an inner surface of the lens barrel. The guide projected rib is fitted in the guide groove by clearance fit.

Further, a boss projecting radially is provided on the outer ring surface of the lens fixing ring, and the projected rail is arranged on the boss. The boss passes through the bar shaped through hole and is mated with the bar shaped through hole by clearance fit.

Further, the front end of the lamp barrel is provided with a connecting barrel, and a first snap ring is provided in the connecting barrel. A second snap ring is provided at the rear end of the lens barrel, and the first snap ring is snap fitted with the second snap ring.

Further, a locating hole is provided on the second snap ring; a sliding pin is provided in the connecting barrel, which can be inserted into the locating hole and removed from the locating hole. A pushing member for driving the sliding pin to move out of the locating hole is also provided on the connecting barrel. A barrel wall through hole is provided on a barrel wall of the connecting barrel, and the pushing member passes through the barrel wall through hole, such that at least a portion of the pushing member is located outside of the connecting barrel.

Further, a locating pillar extending toward the locating hole is provided in the connecting barrel. The sliding pin is installed on the locating pillar and can move forward and backward on the locating pillar. A first elastic member for driving the sliding pin to move toward the locating hole is connected between the locating pillar and the sliding pin.

Further, the pushing member comprises a pushing end, a connecting rod, and an operating end connected successively. The pushing end is located in the connecting barrel and extends toward the sliding pin. The connecting rod passes through the barrel wall through hole, the operating end is located on the outside of the connecting barrel, and a second elastic member for driving the pushing end to move away from the sliding pin is provided between the connecting rod and the connecting barrel.

Further, a sliding pin projection is provided at a side of the sliding pin facing a pushing end, and the sliding pin projection has a projection ramp at a side facing the first snap ring. The projection ramp extends toward the barrel wall of the connecting barrel in a direction from the first snap ring to the sliding pin projection, and along the axial direction of the connecting barrel, the pushing end is at least partially located between front and rear ends of the projection ramp.

The above technical solutions have the following advantageous effects: the luminaire provided in the present disclosure rotates the focusing ring during focusing, acts on the projected rail through the spiral groove, and, finally, drives the lens fixing ring and the lens to move forward and backward in the lens barrel to adjust the distance between the lens and the light source, so as to facilitate focusing and make the focusing accuracy more accurate.

DETAILED DESCRIPTION

Figure 1:
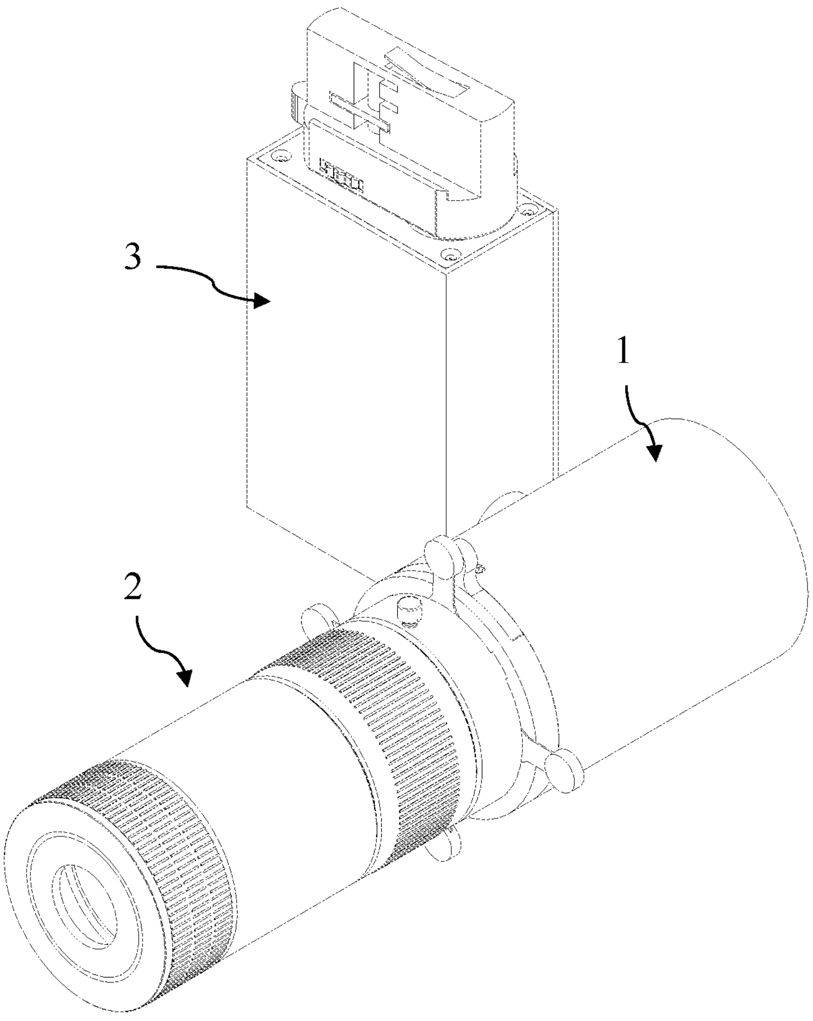
FIG. 1 is a perspective view of a luminaire provided in an embodiment of the disclosure.
Figure 2:
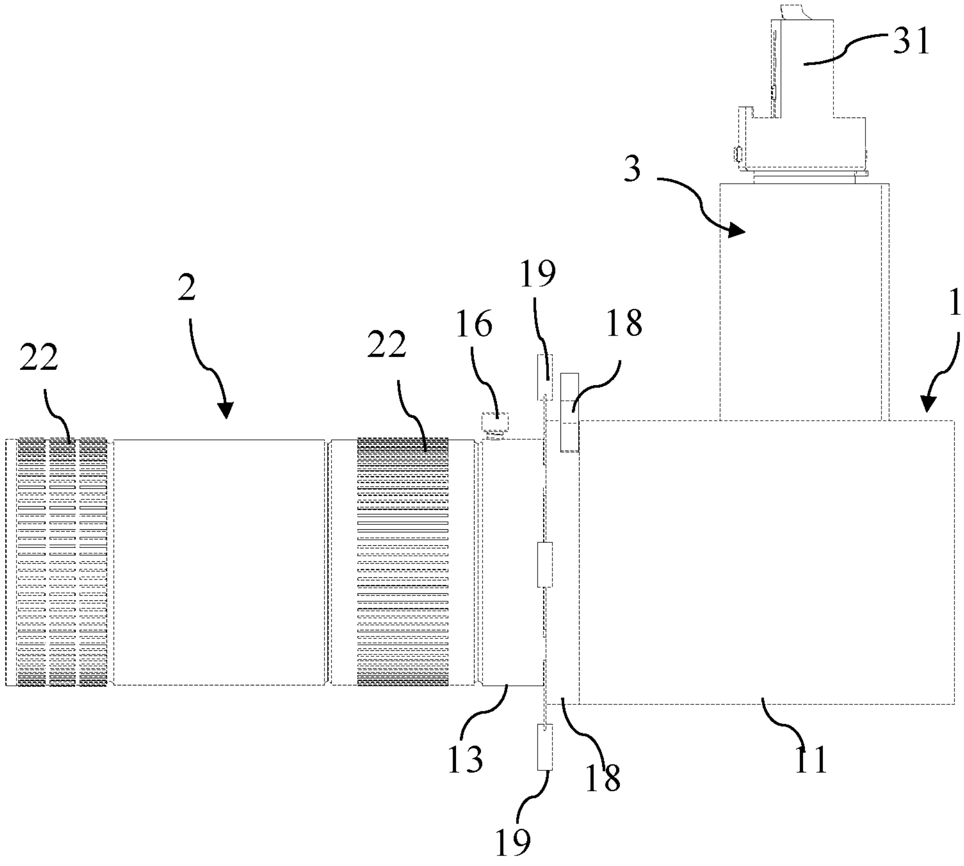
FIG. 2 is a side view of the luminaire shown in FIG. 1.
Figure 3:
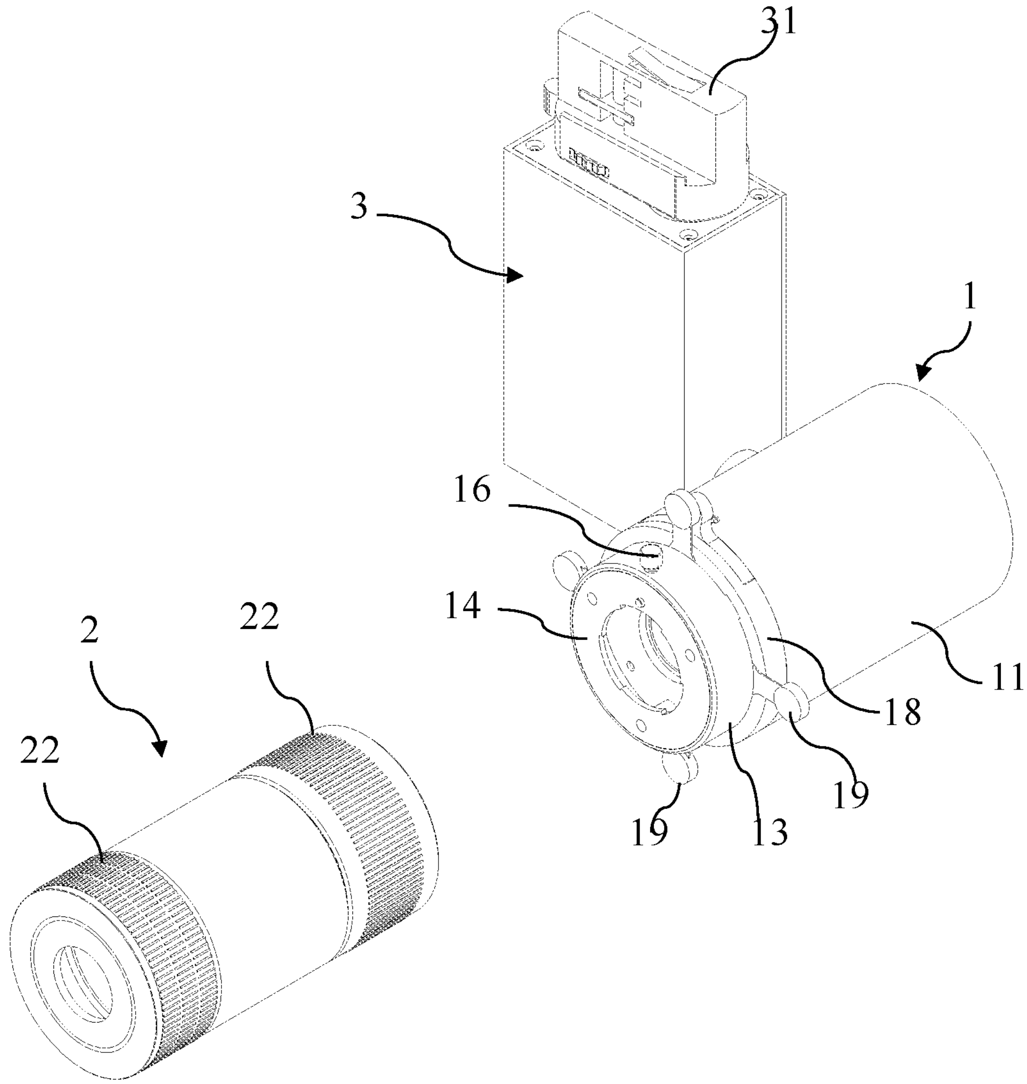
FIG. 3 is an explosive view of a lamp barrel and a lens assembly of the luminaire shown in FIG. 1.
Figure 4:
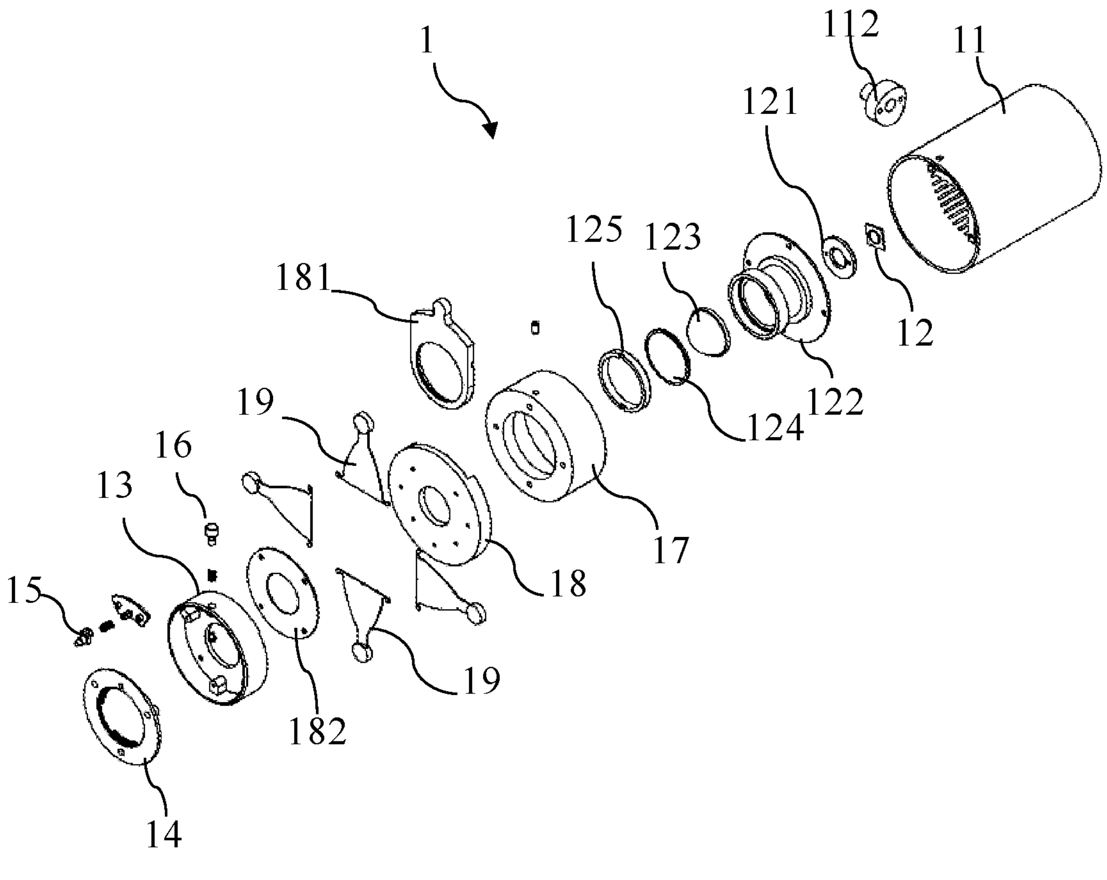
FIG. 4 is an explosive view of the lamp barrel.

Embodiments of the present disclosure are further described below with reference to the figures, wherein, the same reference numeral denotes the same part. It should be noted that terms as used in the following description, "front", "rear", "left", "right", "up", and "down" indicate a direction in the figures, and terms "inner" and "outer" respectively indicate the direction towards or away from a geometric center of a particular part.

As shown in FIGS. 1-9 and 16, a luminaire provided in an embodiment of the present disclosure comprises a lamp barrel 1 having a light source 12 and a lens assembly 2 detachably connected with the lamp barrel 1.

The lens assembly 2 comprises a lens barrel 21 detachably connected with a lamp barrel 1 and a focusing member 22 assembled on the lens barrel 21.

The focusing member 22 comprises a focusing ring 221 sheathed on the lens barrel 21 and rotatable on the lens barrel 21, a lens fixing ring 222 installed on the lens barrel 21 and movable forward and backward, and a lens 223 installed on the lens fixing ring 222.

A spiral groove 2211 is provided on an inner surface of the focusing ring 221, and a projected rail 2221 is provided on an outer surface of the lens fixing ring 222.

A bar shaped through hole 211 extending along an axial direction of the lens barrel 21 is provided on the lens barrel 21.

The projected rail 2221 passes through the bar shaped through hole 211 and is mated with the spiral groove 2211 by clearance fit.

The luminaire provided in the disclosure may be a downlight, a track light, or a spot light and so on.

The luminaire provided in the disclosure comprises the lamp barrel 1 and the lens assembly 2.

The light source 12, such as lamp bulb, light-emitting diode (LED) lamp bead, etc., is provided in lamp barrel 1.

The lamp barrel 1 comprises a lamp barrel shell 11, in which a radiator 111 is installed, and the light source 12 is installed on the radiator 111 through a light source bracket 121. A light source lens is arranged in the lamp barrel shell 11 in front of the light source 12. The light source 12 is connected to an external power supply through a wire.

The lens assembly 2 comprises the lens barrel 21 and the focusing member 22. The lens barrel 21 can be detachably connected with a front end of the lamp barrel 1. Specifically, a back end of the lens barrel 21 is screwed to the front end of the lamp barrel shell 11, and they may be also connected by a detachable connection structure.

The focusing member 22 comprises the focusing ring 221, the lens fixing ring 222 and the lens 223.

At least one turn of spiral groove 2211 is provided on the inner surface of the focusing ring 221. The spiral groove 2211 is a spiral-shaped groove arranged annularly on the inner surface of the focusing ring 221 and extending along an axial direction of the focusing ring 221, similar to the extension mode of a spring.

A corrugated surface 2212 or uneven surface is provided on the inner surface of the focusing ring 221 to facilitate the operator to rotate the focusing ring 221.

The projected rail 2221 is provided on the outer surface of the lens fixing ring 222 and is projected along a radial direction of the lens fixing ring 222.

In order to enable the projected rail 2221 to pass through the lens barrel 21, the bar shaped through hole 211 is provided on the lens barrel 21, which extends along the axial direction of the lens barrel 21. The bar shaped through hole 211 is an elongated through hole whose length is greater than its width, such that the projected rail 2221 can move forward and backward in the bar shaped through hole 211.

During assembly, the focusing ring 221 is sheathed on the lens barrel 21 by clearance fit or rolling fit, such that the focusing ring 221 can rotate on the lens barrel 21. In order to facilitate the rotation of the focusing ring 221 on the lens barrel 21, a bearing or balls can be installed therebetween.

The lens 223 is installed in the lens fixing ring 222. The lens fixing ring 222 is arranged in the lens barrel 21 by clearance fit or sliding fit, such that the lens fixing ring 222 can move along the axial direction in the lens barrel 21. The projected rail 2221 passes through the bar shaped through hole 211, and the projected rail 2221 is fitted in the spiral groove 2211 by clearance fit, such that the projected rail 2221 can rotate relative to the spiral groove 2211.

When rotating the focusing ring 221, a groove wall of the spiral groove 2211 exerts a force on the projected rail 2221, and the projected rail 2221 moves linearly along the bar shaped through hole 211 without rotating, so as to drive the focusing ring 221 to move with the lens 223 in the lens barrel 21, to adjust the distance between the lens 223 and the light source 12, and thus the focal length, such that the irradiation range of the luminaire can be adjusted.

When the focusing ring 221 is rotated in a first direction, under the action of the spiral groove 2211, the focusing ring 221 moves linearly forward with the lens 223 in the lens barrel 21, increasing the distance between the lens 223 and the light source 12. When the focusing ring 221 is rotated in a second direction opposite to the first direction, under the action of the spiral groove 2211, the focusing ring 221 moves linearly backward with the lens 223 in the lens barrel 21, reducing the distance between the lens 223 and the light source 12.

The pitch of the spiral groove 2211 is L, and the linear movement distance of the projected rail 2221 along the axial direction is L for each rotation (360°) of the focusing ring 221.

Thus, the luminaire provided in the disclosure rotates the focusing ring 221 during focusing, acts on the projected rail 2221 through the spiral groove 2211, and finally drives the lens fixing ring 222 and the lens 223 to move forward and backward in the lens barrel 221 to adjust the distance between the lens 223 and the light source 12, so as to facilitate focusing and make the focusing accuracy more accurate.

Figure 5:
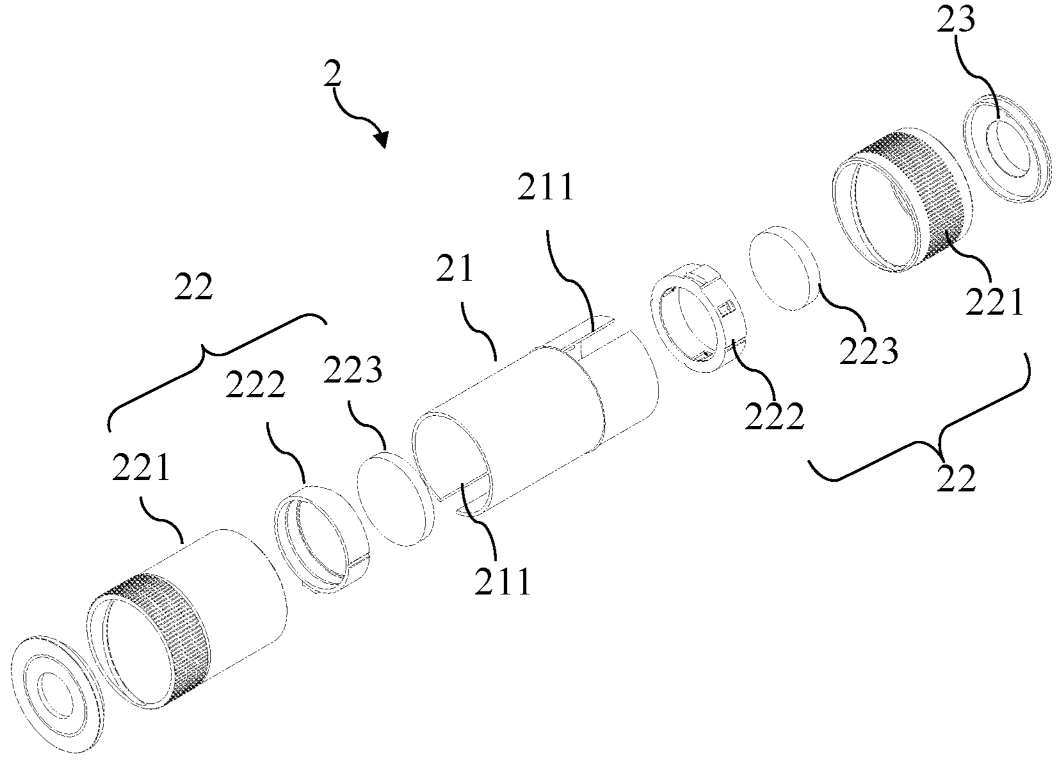
FIG. 5 is an explosive view of the lens assembly.
Figure 6:
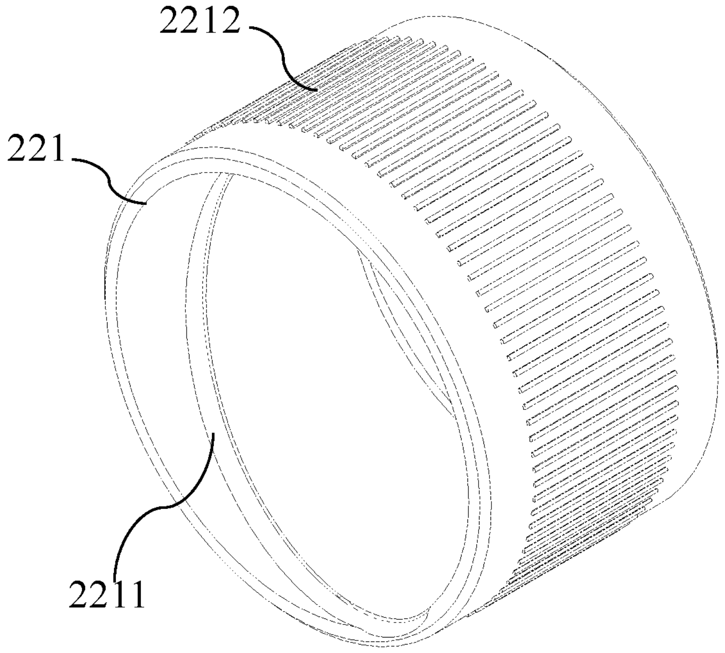
FIG. 6 is a perspective view of a focusing ring.
Figure 9:
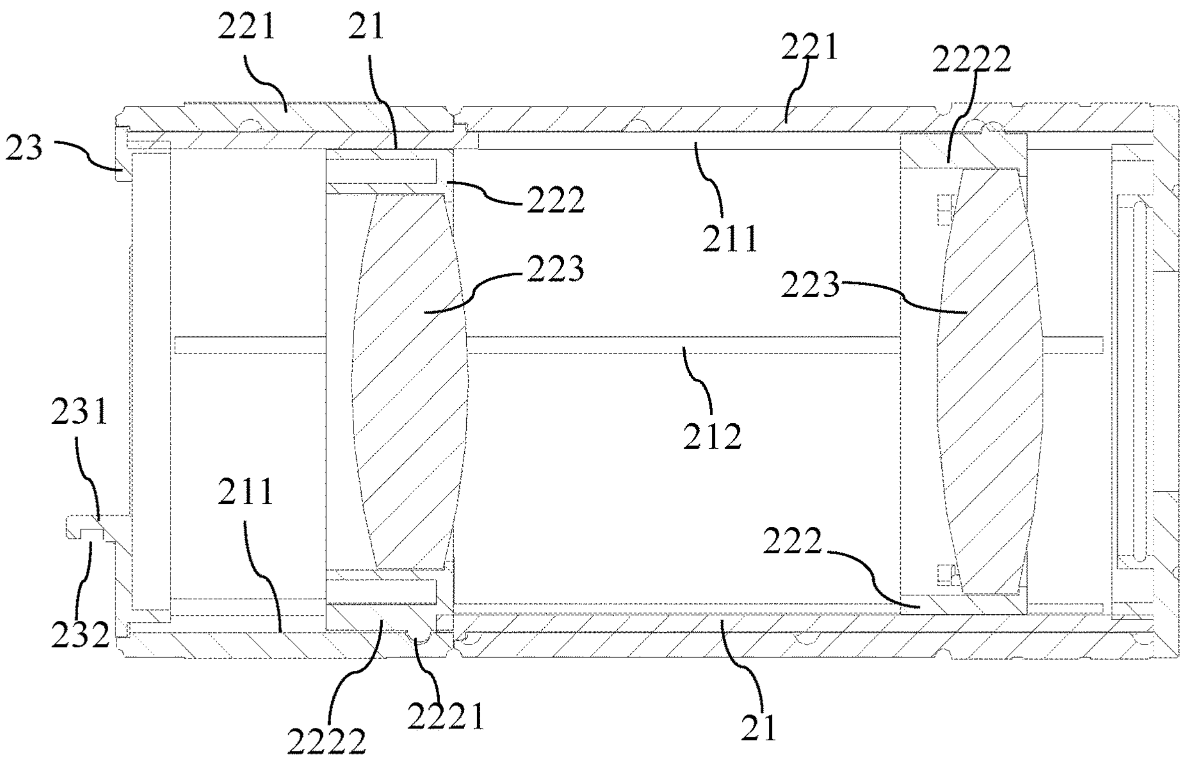
FIG. 9 is a sectional view of the lens assembly.
Figure 10:
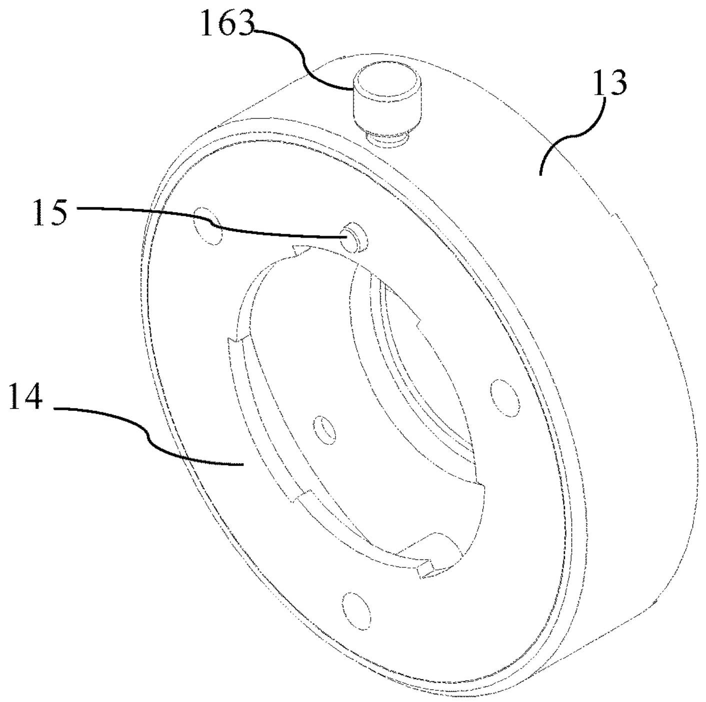
FIG. 10 is a perspective view of a first snap ring assembled on a connecting barrel.
Figure 11:
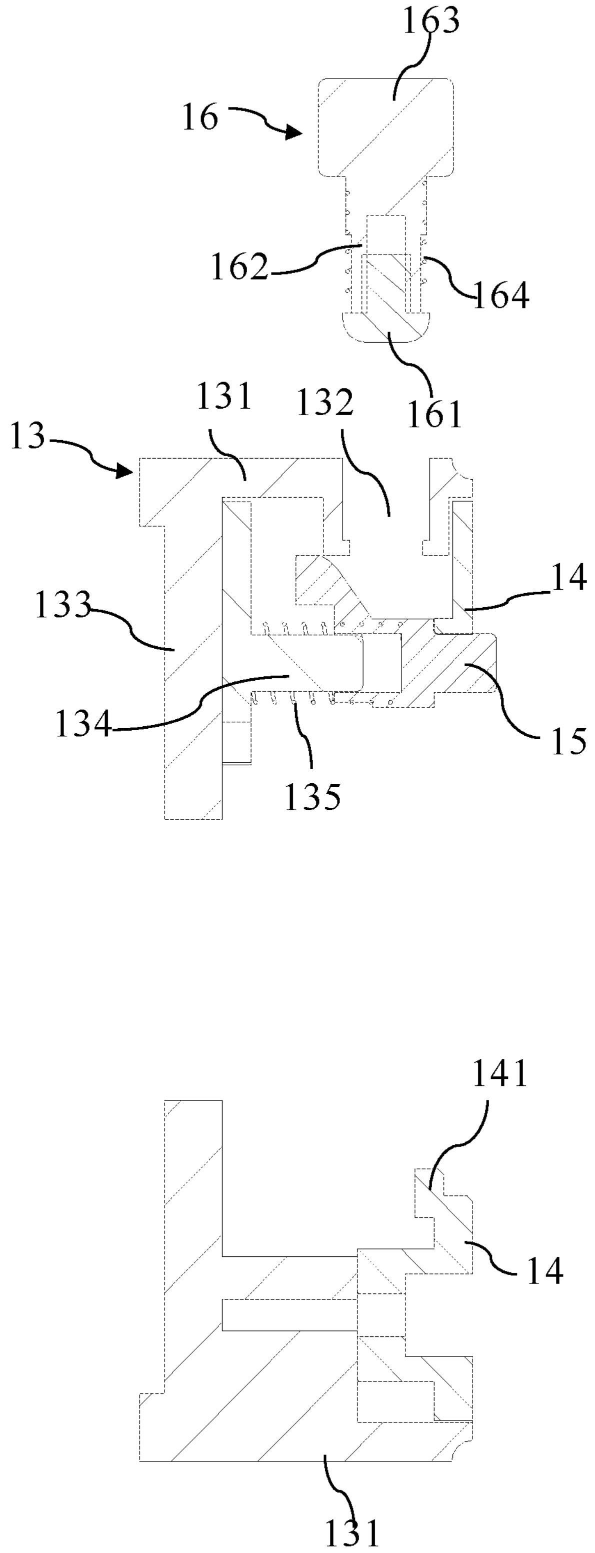
FIG. 11 is an explosive view of a pushing member, the connecting barrel, the first snap ring, and a sliding pin.
Figure 16:
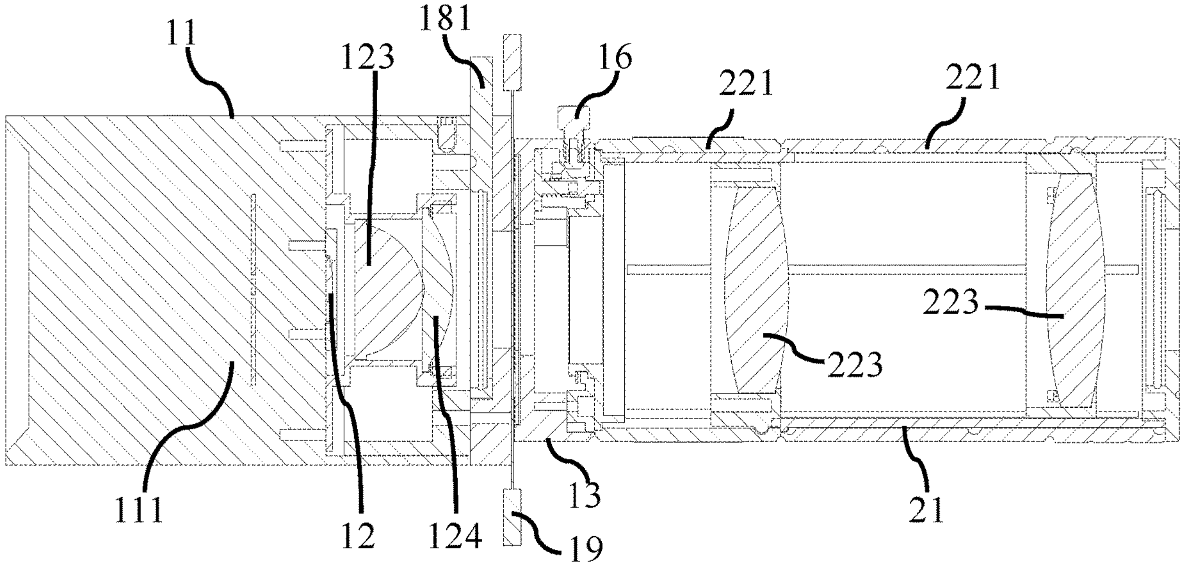
FIG. 16 is a sectional view of the lamp barrel and lens assembly assembled together.

In one of the embodiments, as shown in FIGS. 5, 9 and 16, two focusing members 22 arranged one behind the other are assembled on the lens barrel 21.

Accordingly, two bar shaped through holes 211 arranged one behind the other are provided on the lens barrel 21.

The projected rail 2221 of one of the focusing members 22 passes through one bar shaped through hole 211, and the projected rail 2221 of the other focusing member 22 passes through the other bar shaped through hole 211.

In other words, two sets of focusing members 22 are installed in the lens barrel 21. One set of focusing member 22 is located at a front end of the lens barrel 21, and the other set of focusing member 22 is located at a rear end of the lens barrel 21.

Two bar shaped through holes 211 are provided on the lens barrel 21, one bar shaped through hole 211 is located in a rear half of the lens barrel 21, and one bar shaped through hole 211 is located in a front half of the lens barrel 21.

The two sets of focusing members 22 are correspondingly installed on the lens barrel 21. Specifically, the focusing ring 221 of a set of focusing member 22 at the rear end is sheathed on the rear end of the lens barrel 21, and the projected rail 2221 of its lens fixing ring 222 passes through the bar shaped through hole 211 located in the rear half of the lens barrel 21, and then is mated with the spiral groove 2211 on the inner surface of the focusing ring 221 at the rear end. The focusing ring 221 of a set of focusing member 22 at the front end is sheathed on the front end of the lens barrel 21, and the projected rail 2221 of its lens fixing ring 222 passes through the bar shaped through hole 211 located in the front half of the lens barrel 21, and then is mated with the spiral groove 2211 on the inner surface of the focusing ring 221 at the front end.

Figure 8:
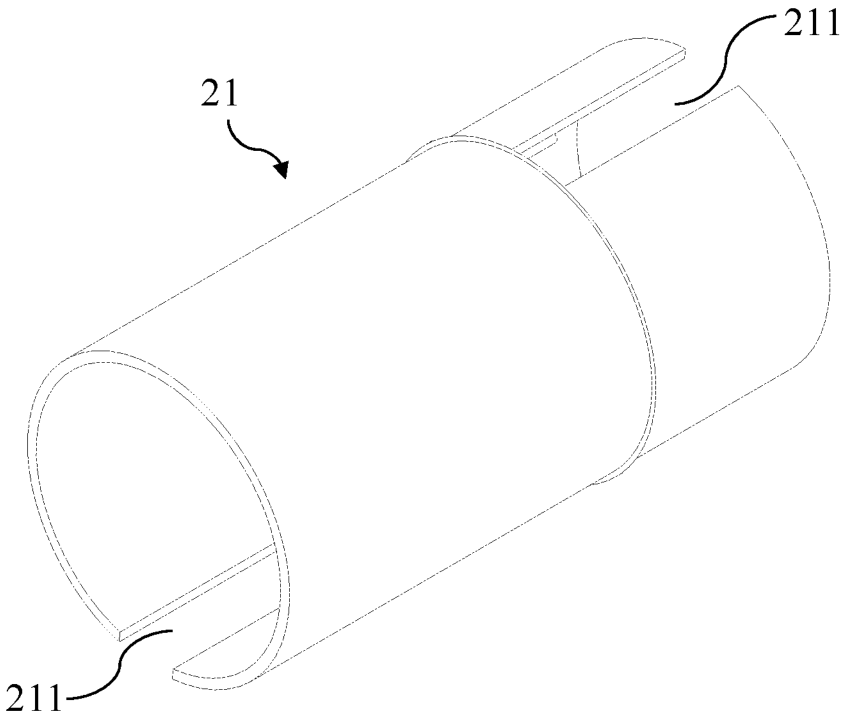
FIG. 8 is a perspective view of a lens barrel.

In one of the embodiments, as shown in FIGS. 5 and 8-9, an opening of one of the bar shaped through holes 211 is located at the front end of the lens barrel 21, and an opening of the other bar shaped through hole 211 is located at the rear end of the lens barrel 21. Two bar shaped through holes 211 are arranged on opposite sides of the lens barrel 21.

In this arrangement, it is convenient to slide the projected rail 2221 from the opening into the bar shaped through hole 211, and the communication of two bar shaped through holes 211 can be avoided.

One bar shaped through hole 211 can be arranged on an upper half of the lens barrel 21, and its opening is located at the rear end of the lens barrel 21. The other bar shaped through hole 211 can be arranged on a lower half of the lens barrel 21, and its opening is located at the front end of the lens barrel 21. They can also be arranged in similar other ways.

Figure 7:
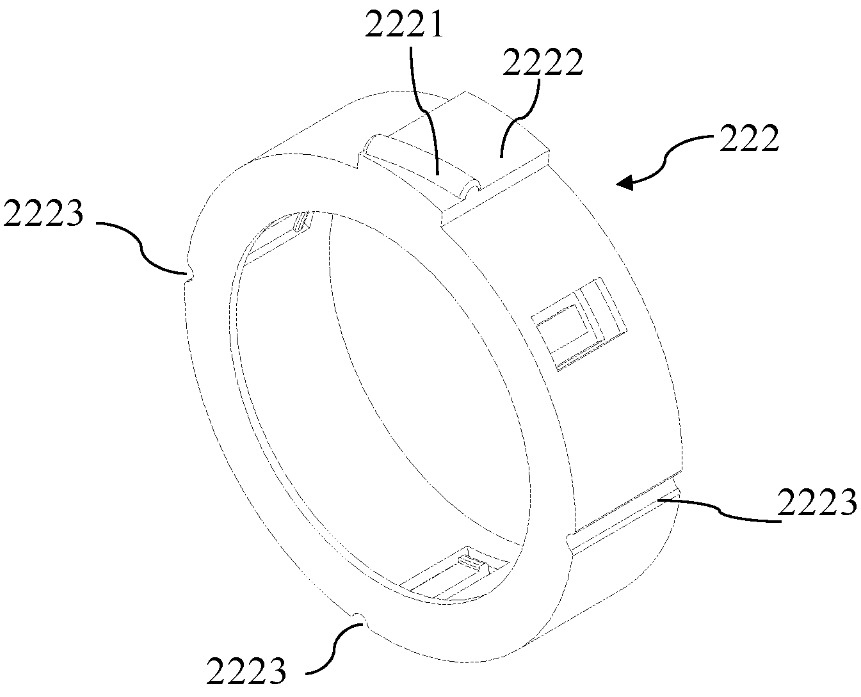
FIG. 7 is a perspective view of a lens fixing ring.

In one of the embodiments, as shown in FIGS. 7 and 9, a guide groove 2223 extending along the axial direction is provided on an outer ring surface of the lens fixing ring 222, and a guide projected rib 212 extending along the axial direction is provided on an inner surface of the lens barrel 21.

The guide projected rib 212 is fitted in the guide groove 2223 by clearance fit.

The guide projected rib 212 is provided on the inner surface of the lens barrel 21 and extends along the axial direction of the lens barrel 21. The guide groove 2223 is provided on the outer ring surface of the lens fixing ring 222 and extends along the axial direction of the lens fixing ring 222. During assembly, the guide projected rib 212 is fitted in the guide groove 2223 by clearance fit, such that the guide projected rib 212 can slide forward and backward relative to the guide groove 2223, providing guidance for the forward and backward movement of the lens fixing ring 222.

Preferably, the guide projected rib 212 is formed integrally with the lens barrel 21, to obtain high structural strength and facilitate forming.

Preferably, a plurality of guide grooves 2223 are provided on the outer ring surface of the lens fixing ring 222, and a plurality of guide projected ribs 212 are accordingly provided on the inner surface of the lens barrel 21 to improve the guiding effect on the lens fixing ring 222.

In one of the embodiments, as shown in FIGS. 6-9, a boss 2222 projecting radially is provided on the outer ring surface of the lens fixing ring 222, and the projected rail 2221 is provided on the boss 2222.

The boss 2222 passes through the bar shaped through hole 211 and is mated with the bar shaped through hole 211 by clearance fit.

The boss 2222 is rectangular and passes through the bar shaped through hole 211. On the one hand, the boss 2222 is used to cooperate with the bar shaped through hole 211, and on the other hand, it is used to support the projected rail 2221. The rectangular boss 2222 is mated with the bar shaped through hole 211 to improve the stability during relative sliding, which is conducive to improve the guide effect of the bar shaped through hole 211 on the lens fixing ring 222.

The projected rail 2221 is formed integrally on the boss 2222, such that the projected rail 2221 only bears the function of mating with the spiral groove 2211, and does not need to bear the need of mating with the bar shaped through hole 211, which can effectively reduce the load of the projected rail 2221 and reduce wear.

In one of the embodiments, as shown in FIGS. 2-4 and 9-14, a connecting barrel 13 is provided at the front end of the lamp barrel 1, and a first snap ring 14 is provided within the connecting barrel 13.

A second snap ring 23 is provided at the rear end of the lens barrel 21, and the first snap ring 14 is snap-fitted with the second snap ring 23.

The connecting barrel 13 has a bottom ring 133 and a barrel wall 131 extending forward on the bottom ring 133. The bottom ring 133 is connected with the front end of the lamp barrel 1. Specifically, it is connected with the front end of the lamp barrel shell 11 of the lamp barrel 1 by screws.

The first snap ring 14 is assembled on a front portion of the barrel wall 131 and connected with the barrel wall 131 through screws. A claw 141 projecting radially inwardly is provided at a center hole of the first snap ring 14.

The second snap ring 23 has a snap ring first sleeve 234 extending forward. The snap ring first sleeve 234 is inserted into the rear end of the lens barrel 21 and is in threaded connection with the lens barrel 21.

A snap ring second sleeve 231 extending backward is provided at the center hole of the second snap ring 23, and a catch groove 232 is provided on an outer surface of the snap ring second sleeve 231 facing the snap ring first sleeve 234.

During assembly, the snap ring second sleeve 231 passes through the center hole of the first snap ring 14, and then the first snap ring 14 is rotated to a certain angle, to snap the claw 141 into the catch groove 232, so as to make the first snap ring 14 snap fitted into the second snap ring 23. When the first snap ring 14 is rotated in reverse, the claw 141 is detached from the catch groove 232. This arrangement facilitates assembly of the lens assembly 2 on the lamp barrel 1 and replacement of the lens assembly 2.

In one of the embodiments, as shown in FIGS. 9-14, a locating hole 233 is provided on the second snap ring 23.

A sliding pin 15 which can be inserted into and removed from the locating hole 233 is provided in the connecting barrel 13.

A pushing member 16 for driving the sliding pin 15 to move out of the locating hole 233 is configured on the connecting barrel 13.

A barrel wall through hole 132 is provided on a barrel wall 131 of the connecting barrel 13, and the pushing member 16 passes through the barrel wall through hole 132, such that at least a portion of the pushing member 16 is located on the outside of the connecting barrel 13.

The locating hole 233 is provided on the second snap ring 23, which runs through front and rear sides of the second snap ring 23.

A snap ring through hole is provided at a position of the first snap ring 14 corresponding to the locating hole 233.

The sliding pin 15 is provided within the connecting barrel 13, which can be extended forward and retracted backward, such that it can be inserted into and removed from the locating hole 233. After the sliding pin 15 passes through the snap ring through hole and is inserted into the locating hole 233, the first snap ring 14 and the second snap ring 23 are locked and cannot rotate relative to each other, and the claw 141 and the catch groove 232 are locked and cannot be detached, locking the lens assembly 2 on the lamp barrel 1.

The pushing member 16 is used to drive the sliding pin 15 to move out of the locating hole 233. The pushing member 16 passes through the barrel wall through hole 132 from inside to outside, such that a portion of the pushing member 16 is located outside of the connecting barrel 13. An operator can press the pushing member 16, to make the pushing member 16 toggle the sliding pin 15 to move the sliding pin 15 out of the locating hole 233, and at this time, the first snap ring 14 and the second snap ring 23 can rotate relative to each other, and thus the first snap ring 14 can be rotated to detach the claw 141 from the catch groove 232, so as to separate the second snap ring 23 from the first snap ring 14, detaching the lens assembly 2 from the lamp barrel 1.

In one of the embodiments, as shown in FIGS. 11-15, a locating pillar 134 extending towards the locating hole 233 is provided within the connecting barrel 13.

The sliding pin 15 is installed on the locating pillar 134 and can move forward and backward on the locating pillar 134.

A first elastic member 135 for driving the sliding pin 15 to move towards the locating hole 233 is connected between the locating pillar 134 and the sliding pin 15.

The locating pillar 134 is provided on the bottom ring 133 and extends toward the locating hole 233. A receiving groove 151 is provided at a rear end of the sliding pin 15. A front end of the locating pillar 134 is inserted into the receiving groove 151 by clearance fit, such that the sliding pin 15 can move forward and backward on the locating pillar 134. The first elastic member 135 is connected between the locating pillar 134 and the sliding pin 15. The first elastic member 135 is used to drive the sliding pin 15 to move towards the locating hole 233, such that the locating pin 15 can pass through the snap ring through hole and be inserted into the locating hole 233.

The first elastic member 135 is an expansion spring or elastic member.

In one of the embodiments, as shown in FIGS. 11-14, the pushing member 16 comprises a pushing end 161, a connecting rod 162, and an operating end 163 connected successively.

The pushing end 161 is located in the connecting barrel 13 and extends toward the sliding pin 15. The connecting rod 162 passes through the barrel wall through hole 132. The operating end 163 is located outside of the connecting barrel 13.

A second elastic member 164 for driving the pushing end 161 to move away from the sliding pin 15 is provided between the connecting rod 162 and the connecting barrel 13.

The pushing end 161, the connecting rod 162, and the operating end 163 are formed integrally. The operating end 163 is located outside of the connecting barrel 13 for the operator to press. The pushing end 161 is located in the connecting barrel 13 and extends toward the slide pin 15 for toggling or pushing the slide pin 15. The connecting rod 162 is connected between the pushing end 161 and the operating end 163, which passes through the barrel wall through hole 132 and can slide in the barrel wall through hole 132.

The second elastic member 164 is connected between the connecting rod 162 and the connecting barrel 13 to drive the pushing end 161 to move away from the sliding pin 15. Specifically, the second elastic member 164 is connected between the connecting rod 162 and the barrel wall 131 or between the connecting rod 162 and a hole wall of the barrel wall through hole 132. The second elastic member 164 is an expansion spring or elastic member.

In an initial state, under the action of the second elastic member 164, the pushing end 161 does not contact with the sliding pin 15, the operating end 163 is raised, and the sliding pin 15 is inserted into the locating hole 233.

When it is needed to replace the lens assembly 2, the operator presses down the operating end 163, to make the pushing end 161 contact with the sliding pin 15, and push the sliding pin 15 to overcome the force of the first elastic member 135 and move backward, such that the sliding pin 15 moves away from the locating hole 233, and thus the second snap ring 23 is separated from the first snap ring 14, to replace the lens assembly 2.

Figure 12:
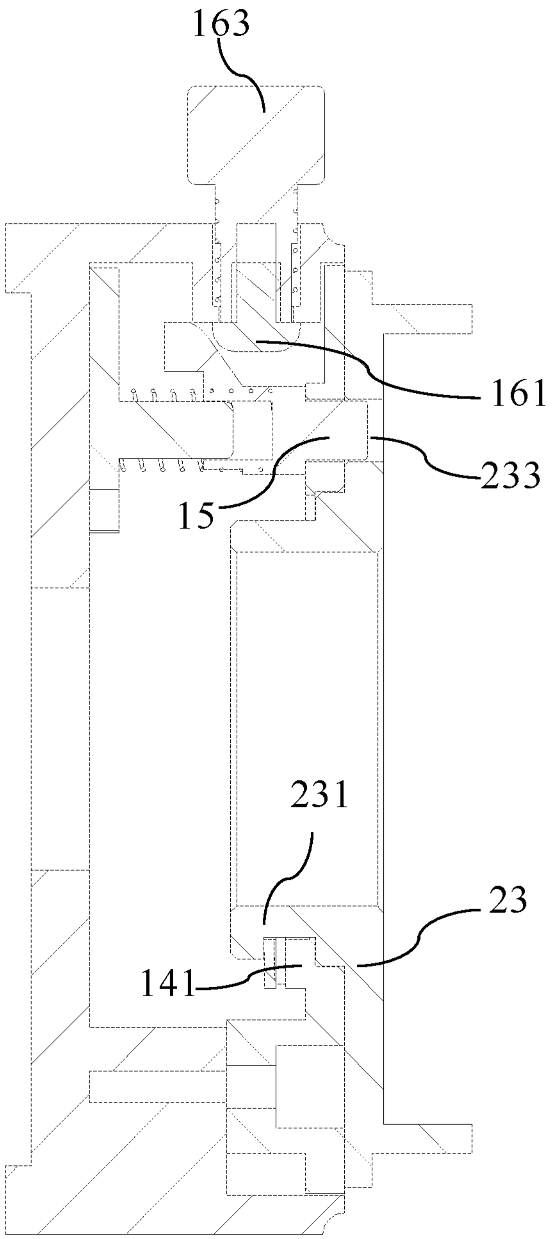
FIG. 12 is a sectional view of the pushing member, the connecting barrel, the first snap ring, the sliding pin, and a second snap ring assembled together.
Figure 13:
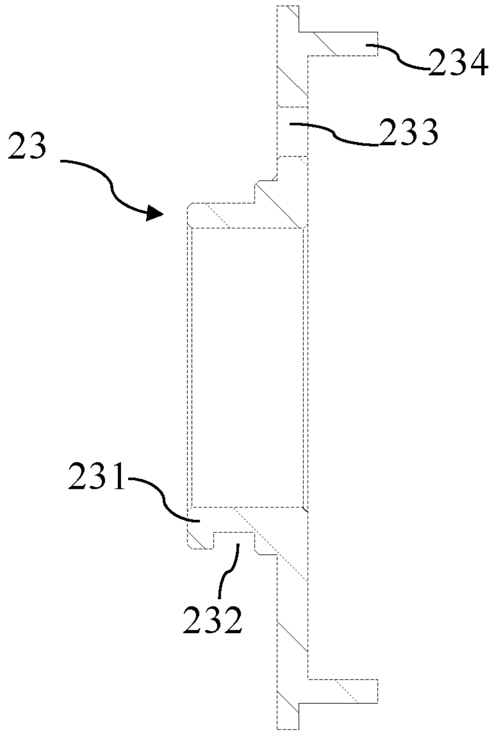
FIG. 13 is a sectional view of the second snap ring.
Figure 14:
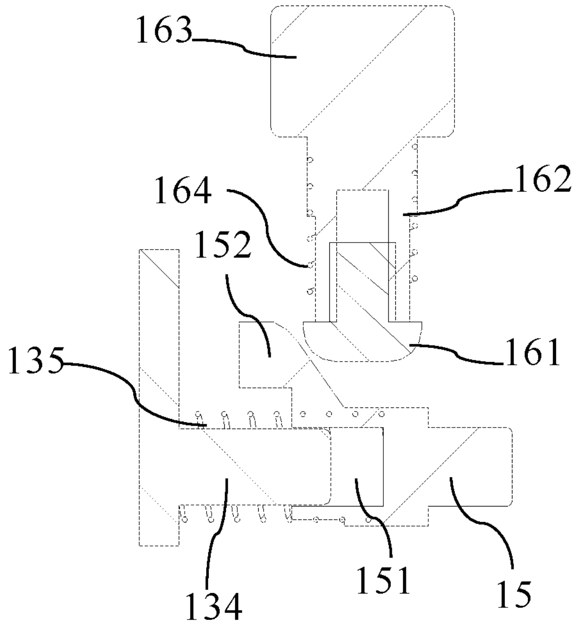
FIG. 14 is an assembly schematic diagram of the pushing member, the sliding pin, and a locating pillar.
Figure 15:
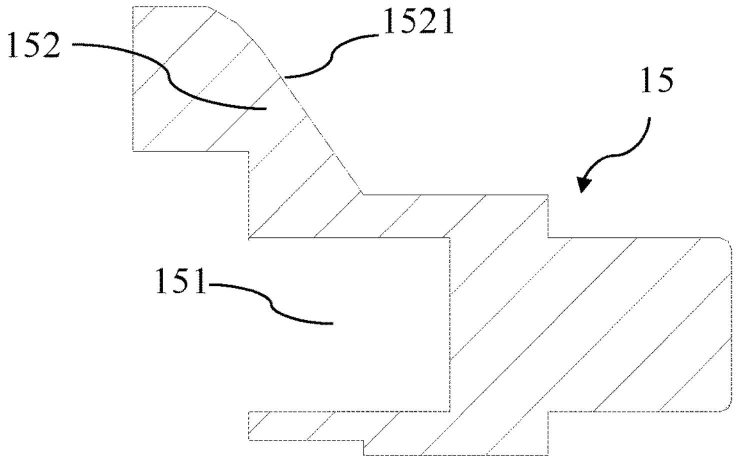
FIG. 15 is a sectional view of the sliding pin.

In one of the embodiments, as shown in FIGS. 12 and 15, a sliding pin projection 152 is provided on a side of the sliding pin 15 facing the pushing end 161.

A projection ramp 1521 is provided at a side of the sliding pin projection 152 facing the first snap ring 14.

In the direction from the first snap ring 14 to the sliding pin projection 152, the projection ramp 1521 extends toward the barrel wall 131 of the connecting barrel 13.

Along an axis direction of the connecting barrel 13, the pushing end 161 is at least partially located between front and rear ends of the projection ramp 1521.

Specifically, the sliding pin projection 152 is provided at the rear end of the sliding pin 15, and the projection ramp 1521 is provided at its front side (the side facing the first snap ring 14), and is located proximate to a side of the pushing end 161 and facing the first snap ring 14.

In the direction from front to back, the sliding pin projection 152 extends in a direction toward the barrel wall 131, that is, a direction from the first snap ring 14 to the sliding pin projection 152, and sliding pin projection 152 extends obliquely backward and outward.

In the axial direction of the connecting barrel 13, all or at least a portion of the pushing end 161 is located between the front and rear ends of the projection ramp 1521. When the operating end 163 is pressed to move the pushing end 161 radially inwardly, at least a portion of the pushing end 161 can contact with the projection ramp 1521, to push the sliding pin 15 to overcome the force of the first elastic member 135 and move backward, so as to disengage the sliding pin 15 from the locating hole 233.

As shown in FIGS. 1-5 and 16, the luminaire provided in an embodiment of the present disclosure comprises the lamp barrel 1 having the lamp barrel shell 11. The radiator 111 is provided within the lamp barrel shell 11, and the lamp barrel shell 11 is connected with a power supply box 3 through a connecting shaft 112, which can be rotated to adjust the angle relative to the power supply box 3. A guide rail head 31 is provided on a top of the power supply box 3, which is used to connect with the track in the house or illumination site.

The radiator 111 is installed in the lamp barrel shell 11, and the light source 12 is installed at a front end of the radiator 111 through the light source bracket 121.

A first light source lens 123 is installed in the lamp barrel shell 11 through a lens rear bracket 122, which is located in front of the light source 12. A second light source lens 124 is installed in front of the first light source lens 123 through a lens front bracket 125.

A fixing ring 17 is installed in the front end of the lamp barrel shell 11, and the second light source lens 124 is installed in the fixing ring 17.

The projection bracket fixing ring 18 is located in the front of and the outside of the lamp barrel shell 11, and is connected with the fixing ring 17 through screw. A notch is provided at a rear side of the projection bracket fixing ring 18, and a projection bracket 181 is inserted into the notch. The projection bracket 181 is used to hold slides or projection film, such as film printed with images or logos.

An insert fixing ring 182 is installed in front of the projection bracket fixing ring 18, and connected with the projection bracket fixing ring 18 through screw. A plurality of inserts 19 are arranged between the projection bracket fixing ring 18 and the insert fixing ring 182 to adjust the area that can be projected by a central hole of the insert fixing ring 182. When the insert 19 is inserted inwardly, a portion of the central hole of the insert fixing ring 182 can be covered, and light is emitted from the other portion of the central hole.

The insert fixing ring 182 is a magnetic ring, the insert 19 is a metal sheet, and the insert 19 can be adsorbed on the insert fixing ring 182.

Insert grooves are provided on a side of the insert fixing ring 182 facing the projection bracket fixing ring 18. The inserts 19 can be inserted into the insert grooves or pulled out of the insert grooves. The insert grooves provide accommodating grooves for the inserts 19 and provide guide for the inserting and pulling of the inserts 19.

The insert fixing ring 182 is connected with the bottom ring 133 of the connecting barrel 13 by fasteners, screws, etc.

The rear end of the barrel wall 131 of the connecting barrel 13 extends backward to enclose the bottom ring 133.

The first snap ring 14 is connected to the front end of the barrel wall 131.

The lens assembly 2 is snap fitted with the first snap ring 14 through the second snap ring 23.

The assembly, disassembly, and replacement of the lens assembly 2 and the lamp barrel 1 can be controlled by the locating pin 15, the pushing member 16, etc., in the above embodiments.

The first light source lens 123 and the second light source lens 124 are used to make the light from the light source 12 shine on the projection film on the projection bracket 181. Lens 223 is used to adjust the focal length such that the image on the projection film can be clearly projected, or to adjust the range of projection.

The above technical solutions can be combined to achieve the best technical effects, according to requirements.

What have been stated above are only principle and preferred embodiments of the present disclosure. It should be noted that, those skilled in the art can make various other modifications based on the principle of the present disclosure, all of which should be deemed to fall within the protection scope of the present disclosure.

The invention claimed is:

1. A luminaire, comprising a lamp barrel having a light source and a lens assembly detachably connected with the lamp barrel;

the lens assembly comprises a lens barrel detachably connected with the lamp barrel and a focusing member assembled on the lens barrel;

the focusing member comprises a focusing ring sheathed on the lens barrel and rotatable on the lens barrel, a lens fixing ring installed in the lens barrel and movable forward and backward, and a lens installed in the lens fixing ring;

a spiral groove is provided on an inner surface of the focusing ring, and a projected rail is provided on an outer surface of the lens fixing ring;

a bar shaped through hole extending along an axial direction of the lens barrel is provided on the lens barrel; and the projected rail passes through the bar shaped through hole and is mated with the spiral groove by clearance fit, wherein:

a boss projecting radially is provided on an outer ring surface of the lens fixing ring, and the projected rail is provided on the boss; and the boss passes through the bar shaped through hole and is mated with the bar shaped through hole by clearance fit.

2. The luminaire according to claim 1, wherein, two focusing members arranged one behind the other are assembled on the lens barrel;

two bar shaped through holes are accordingly provided on the lens barrel, and the two bar shaped through holes are arranged one behind the other on the lens barrel; and the projected rail of one focusing member passes through one bar shaped through hole, and the projected rail of the other focusing member passes through the other bar shaped through hole.

3. The luminaire according to claim 2, wherein, an opening of one of the bar shaped through holes is located at a front end of the lens barrel, and an opening of the other bar shaped through hole is located at a rear end of the lens barrel; and the two bar shaped through holes are arranged on opposite sides of the lens barrel.

4. The luminaire according to claim 3, wherein, a connecting barrel is provided at a front end of the lamp barrel, and a first snap ring is provided in the connecting barrel; and a second snap ring is provided at a rear end of the lens barrel, and the first snap ring is snap fitted with the second snap ring.

5. The luminaire according to claim 4, wherein, a locating hole is provided on the second snap ring;

a sliding pin, which can be inserted into the locating hole and removed from the locating hole, is provided in the connecting barrel;

a pushing member for driving the sliding pin to move out of the locating hole is also provided on the connecting barrel; and a barrel wall through hole is provided on a barrel wall of the connecting barrel, and the pushing member passes through the barrel wall through hole, such that at least a portion of the pushing member is located on the outside of the connecting barrel.

6. The luminaire according to claim 5, wherein, a locating pillar extending toward the locating hole is provided in the connecting barrel;

the sliding pin is installed on the locating pillar and can move forward and backward on the locating pillar; and a first elastic member for driving the sliding pin to move toward the locating hole is connected between the locating pillar and the sliding pin.

7. The luminaire according to claim 2, wherein, a connecting barrel is provided at a front end of the lamp barrel, and a first snap ring is provided in the connecting barrel; and a second snap ring is provided at a rear end of the lens barrel, and the first snap ring is snap fitted with the second snap ring.

8. The luminaire according to claim 7, wherein, a locating hole is provided on the second snap ring;

a sliding pin, which can be inserted into the locating hole and removed from the locating hole, is provided in the connecting barrel;

a pushing member for driving the sliding pin to move out of the locating hole is also provided on the connecting barrel; and a barrel wall through hole is provided on a barrel wall of the connecting barrel, and the pushing member passes through the barrel wall through hole, such that at least a portion of the pushing member is located on the outside of the connecting barrel.

9. The luminaire according to claim 8, wherein, a locating pillar extending toward the locating hole is provided in the connecting barrel;

the sliding pin is installed on the locating pillar and can move forward and backward on the locating pillar; and a first elastic member for driving the sliding pin to move toward the locating hole is connected between the locating pillar and the sliding pin.

10. The luminaire according to claim 1, wherein, a guide groove extending along the axial direction is provided on an outer ring surface of the lens fixing ring, and a guide projected rib extending along the axial direction is provided on an inner surface of the lens barrel; and the guide projected rib is fitted in the guide groove by clearance fit.

11. The luminaire according to claim 10, wherein, a connecting barrel is provided at a front end of the lamp barrel, and a first snap ring is provided in the connecting barrel; and a second snap ring is provided at a rear end of the lens barrel, and the first snap ring is snap fitted with the second snap ring.

12. The luminaire according to claim 11, wherein, a locating hole is provided on the second snap ring;

a sliding pin, which can be inserted into the locating hole and removed from the locating hole, is provided in the connecting barrel;

a pushing member for driving the sliding pin to move out of the locating hole is also provided on the connecting barrel; and a barrel wall through hole is provided on a barrel wall of the connecting barrel, and the pushing member passes through the barrel wall through hole, such that at least a portion of the pushing member is located on the outside of the connecting barrel.

13. The luminaire according to claim 1, wherein, a connecting barrel is provided at a front end of the lamp barrel, and a first snap ring is provided in the connecting barrel; and a second snap ring is provided at a rear end of the lens barrel, and the first snap ring is snap fitted with the second snap ring.

14. The luminaire according to claim 13, wherein, a locating hole is provided on the second snap ring;

a sliding pin, which can be inserted into the locating hole and removed from the locating hole, is provided in the connecting barrel;

a pushing member for driving the sliding pin to move out of the locating hole is also provided on the connecting barrel; and a barrel wall through hole is provided on a barrel wall of the connecting barrel, and the pushing member passes through the barrel wall through hole, such that at least a portion of the pushing member is located on the outside of the connecting barrel.

15. The luminaire according to claim 14, wherein, a locating pillar extending toward the locating hole is provided in the connecting barrel;

the sliding pin is installed on the locating pillar and can move forward and backward on the locating pillar; and a first elastic member for driving the sliding pin to move toward the locating hole is connected between the locating pillar and the sliding pin.

16. The luminaire according to claim 14, wherein, the pushing member comprises a pushing end, a connecting rod, and an operating end connected successively;

the pushing end is located in the connecting barrel and extends toward the sliding pin; the connecting rod passes through the barrel wall through hole; and the operating end is located on the outside of the connecting barrel; and a second elastic member for driving the pushing end to move away from the sliding pin is provided between the connecting rod and the connecting barrel.

17. The luminaire according to claim 16, wherein, a sliding pin projection is provided on a side of the sliding pin facing the pushing end;

the sliding pin projection has a projection ramp on a side facing the first snap ring;

along a direction from the first snap ring to the sliding pin projection, the projection ramp extends toward the barrel wall of the connecting barrel;

along an axis direction of the connecting barrel, the pushing end is at least partially located between front and rear ends of the projection ramp.

18. The luminaire according to claim 1, wherein, a connecting barrel is provided at a front end of the lamp barrel, and a first snap ring is provided in the connecting barrel; and a second snap ring is provided at a rear end of the lens barrel, and the first snap ring is snap fitted with the second snap ring.

19. The luminaire according to claim 18, wherein, a locating hole is provided on the second snap ring;

a sliding pin, which can be inserted into the locating hole and removed from the locating hole, is provided in the connecting barrel;

a pushing member for driving the sliding pin to move out of the locating hole is also provided on the connecting barrel; and a barrel wall through hole is provided on a barrel wall of the connecting barrel, and the pushing member passes through the barrel wall through hole, such that at least a portion of the pushing member is located on the outside of the connecting barrel.

* * * * *